United States Patent
Rosenthal et al.

(10) Patent No.: US 6,214,304 B1
(45) Date of Patent: Apr. 10, 2001

(54) METHOD OF REMOVING MERCURY FROM A MERCURY-CONTAINING FLUE GAS

(75) Inventors: Jürgen Rosenthal, Lohmar; Wolfgang Schüttenheim, Wiehl; Marton Klein; Rüdiger Heidrich, both of Gummersbach; Ulrich Nikolai, Hohenwart; Uwe Soldner, Fallingbostel, all of (DE)

(73) Assignee: L & C Steinmüller GmbH (DE)

( * ) Notice: Subject to any disclaimer, the term of this patent is extended or adjusted under 35 U.S.C. 154(b) by 0 days.

(21) Appl. No.: 09/464,650

(22) Filed: Dec. 15, 1999

Related U.S. Application Data

(63) Continuation-in-part of application No. 08/980,548, filed on Dec. 1, 1997, now abandoned.

(30) Foreign Application Priority Data

Dec. 2, 1996 (DE) ............................................... 196 49 927

(51) Int. Cl.[7] .......................... C01G 13/00; B01D 47/00; C01F 17/32; A62D 3/00
(52) U.S. Cl. ........................ 423/210; 423/107; 423/531; 423/561.1; 423/588; 423/231; 423/236; 423/95; 423/134
(58) Field of Search ................................. 423/210, 107, 423/531, 561; 75/670; 588/231, 236; 95/134

(56) References Cited

U.S. PATENT DOCUMENTS

| | | |
|---|---|---|
| 5,034,203 | 7/1991 | Audeh et al. |
| 5,607,496 * | 3/1997 | Brooks ................................. 75/670 |

FOREIGN PATENT DOCUMENTS

| | | |
|---|---|---|
| 44 37 781 A1 | 5/1996 | (DE) . |
| 0 506 132 A1 | 9/1992 | (EP) . |
| 0 709 128 A2 | 5/1996 | (EP) . |
| 6-91129 * | 5/1994 | (JP) ..................................... 423/210 |
| WO 89/08493 | 9/1989 | (WO) . |
| WO 94/22563 | 10/1994 | (WO) . |

OTHER PUBLICATIONS

Nebel et al; Mercury Control Systems... To Go; 1992; pp. 40–49.

* cited by examiner

Primary Examiner—Tom Dunn
Assistant Examiner—Eileen E. Nave
(74) Attorney, Agent, or Firm—Robert W. Becker Associates

(57) ABSTRACT

A method of removing mercury from a mercury-containing flue gas, especially flue gas from a refuse incinerator, is provided. The mercury-containing flue gas may also contain dust, further heavy metals, and further gaseous noxious gas components. The mercury, using an alkali sulfide solution, especially sodium sulfide solution, and in particular sodium tetrasulfide solution, is converted to mercury sulfide and the mercury sulfide is precipitated out via a dust separator. The alkali sulfide solution is introduced into the flue gas accompanied by the simultaneous addition of heat.

19 Claims, 1 Drawing Sheet

US 6,214,304 B1

METHOD OF REMOVING MERCURY FROM A MERCURY-CONTAINING FLUE GAS

RELATED APPLICATION

This is a continuation-in-part application of U.S. patent application Ser. No. 08/980,548 filed Dec. 1, 1997 now abandoned.

BACKGROUND OF THE INVENTION

The invention relates to a method of removing mercury from a mercury-containing flue gas that may also contain dust, further heavy metals and further gaseous noxious gas components, especially flue gas from a refuse incinerator; the mercury, using an alkali sulfide solution, especially sodium sulfide solution, and in particular sodium tetrasulfide solution, is converted to mercury sulfide and the mercury sulfide is precipitated out via a dust separator.

Such a method is known from DE 44 37 781 A1, where an aqueous sodium tetrasulfide solution is conveyed to the flue gas immediately after a partial removal of dust from the flue gas in an electrostatic precipitator, i.e. at a relatively high temperature, and thereafter separating off in a fabric filter the mercury sulfide that is formed by precipitation of ionic mercury $Hg^{2++}$ and $Hg^+$ and from metallic mercury $Hg^0$. A scrubbing out of aqueous, gaseous noxious components such as HCl and $SO_2$ is subsequently effected. With the known method, the sodium tetrasulfide solution is sprayed in with the aid of cold atomizing air at room temperature. Relatively large quantities of sodium tetrasulfide were needed for the separation of the mercury. A relatively long contact stretch is required since the sodium tetrasulfide is activated only in the hot flue gas.

It is the object of the present invention to provide a method of the aforementioned type where the mercury separation is improved by means of the introduced alkali sulfide solution, especially sodium sulfide solution.

SUMMARY OF THE INVENTION

This object is realized in that the alkali sulfide solution is introduced into the flue gas accompanied by the simultaneous introduction of heat.

Examples of alkali sulfide solutions can preferably be sodium sulfide solutions and potassium sulfide solutions.

In the specification and the claims, "sodium sulfide solution" means a solution that contains sodium monosulfide and/or sodium polysulfide. A preferred "sodium tetrasulfide solution" that is to be used refers to a solution that essentially contains sodium tetrasulfide, but for technical reasons also contains portions of other polysulfides and possibly monosulfide.

It was surprisingly discovered that by adding heat during the introduction, the separation efficiency of the alkali sulfide, especially the sodium sulfide, in other words the sodium tetrasulfide, is very effective with respect to ionic mercury, and this even at lower flue gas temperatures than exist relative to the known method at the output of the electrostatic precipitator. By using sodium tetrasulfide, the effectiveness is also improved relative to metallic mercury. In addition, with flue gases having high temperatures the contact stretch required for the separation can also be shortened.

The alkali sulfide solution is preferably introduced by means of an auxiliary fluid that is heated prior to being joined with the alkali sulfide solution.

One can proceed on the basis that due to the temperature increase, in the alkali sulfide solution for a relatively short period of time there is accelerated a conversion of the alkali sulfide molecules to substances that absorb mercury, for example in the case of sodium sulfide to the reaction components $Na_2S$, $H_2S$ and S. The temperature increase is preferably in the range of 40–200° C., and preferably about 80–200° C., but could also be in the range of 100–200° C., and further preferably 100–120° C.

The alkali sulfide solution is preferably introduced into the flue gas together with hot steam or vapor as an auxiliary fluid medium, for example via the use of a vapor jet pump or ejector for the introduction of the alkali sulfide solution.

However, it is also conceivable to introduce the alkali sulfide solution into the flue gas together with hot air and/or hot flue gas.

The temperature of the flue gas during introduction of the alkali sulfide solution should be below 300° C., expediently below 250° C., and further preferably below 150° C.

It was furthermore discovered that the effectiveness was improved if the alkali sulfide solution was introduced into a flue gas having increased moisture content at a temperature below 150° C., and furthermore preferably was introduced into a flue gas that was saturated with moisture at a temperature of below 100° C.; if necessary, in the event that the water vapor content of the flue gas is insufficient, the required moisture content is achieved by the additional supply of water.

At low flue gas temperatures, it is expedient to utilize an auxiliary medium having a higher temperature that also acts as a propellant gas. The use of steam as an auxiliary medium is preferred since it has a higher thermal content than do air and flue gas. Furthermore, it was discovered that when steam was used, the formation of the reaction components was improved to a greater extent relative to the use of air as an auxiliary medium. The separation or precipitation of mercury utilizing steam as the auxiliary fluid medium can also be achieved without acidic noxious gas components having to be present in the flue gas.

Therefore, acidic noxious gas components that might be present can be removed from the flue gas, preferably by washing, prior to or after the addition of the alkali sulfide solution and subsequent dust separation. If this washing takes place prior to the addition of the alkali sulfide solution, the preferred moisture saturation is achieved immediately.

For the procedure it is furthermore preferred that prior to the introduction or together with the alkali sulfide solution an oxidizing agent, preferably $H_2O_2$, and/or a sorption agent, preferably activated coke, is added.

If a flue gas having no acidic noxious gas components is provided, it can be expedient to add an acidic gas such as HCl in order to further improve the precipitation.

It is of course also expedient to remove dust from the flue gas prior to the introduction of the alkali sulfide solution. The use of a sodium sulfide solution is preferred, especially the use of a sodium tetrasulfide solution.

BRIEF DESCRIPTION OF THE DRAWING

The invention will now be described in detail in conjunction with the accompanying schematic drawing, in which.

DESCRIPTION OF PREFERRED EMBODIMENTS

Figure 2:
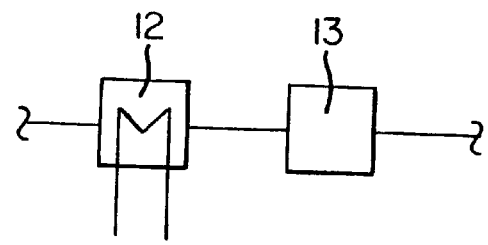
FIG. 2 shows a procedure including fine dust separation in a fabric filter.
Figure 1:
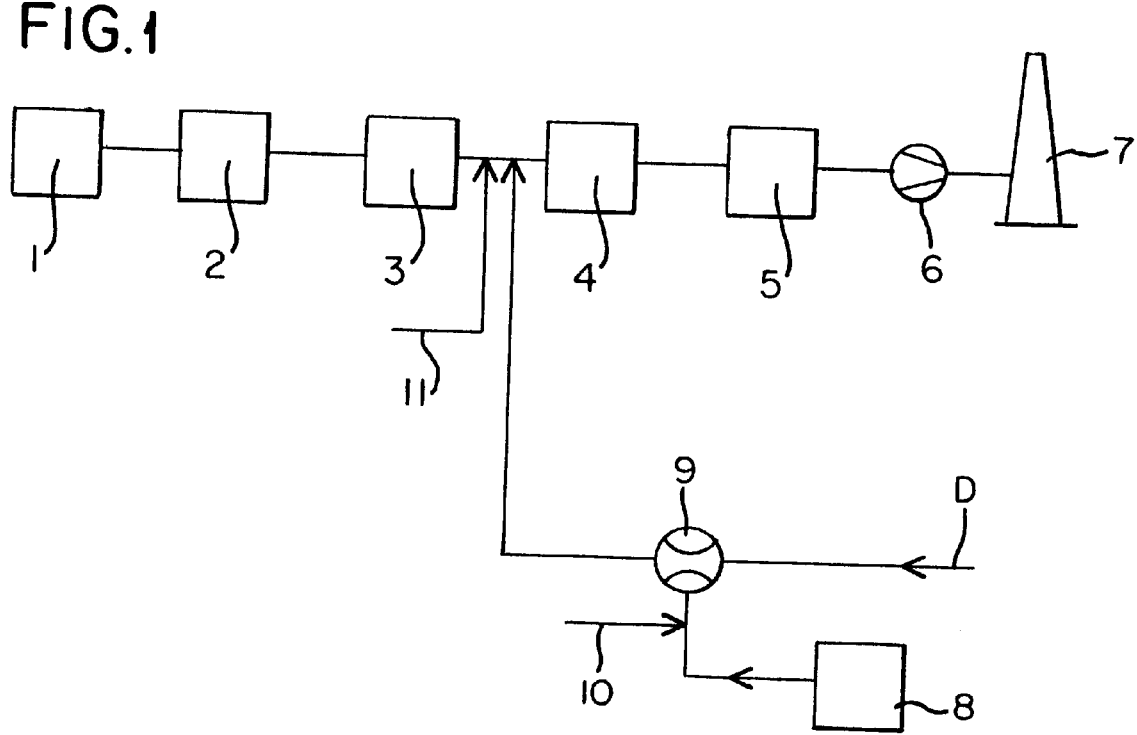
FIG. 1 shows a procedure including fine dust separation in a wet electrostatic filter or precipitator.

In a trash or refuse incinerator 1, refuse is burned at approximately 900° C. and is cooled to approximately 300°

C. with the aid of not separately illustrated heat transfer surfaces. In an electrostatic filter or precipitator 2 disposed downstream, the flue gases are subjected to a rough, initial dust removal without a significant reduction in temperature resulting. In a scrubber 3 disposed downstream and having an acidic and an alkaline washing step, acidic noxious gas components $SO_2$, HCl, HF, etc. as well as heavy metals among others and in part also $Hg^{2+}$ are washed or scrubbed out. However, a satisfactory removal of mercury, especially metallic mercury $Hg^0$, is not achieved in the scrubber.

The scrubbed gas leaves the scrubber 3 saturated with moisture and cooled to a temperature of about 65° C., and is cooled in a subsequent gas cooler or condenser 4 to 55° C., thereby triggering a defined condensation of water droplets on the fine dust, which contains HgS. The fine dust is separated off in the form of a suspension in a wet filter 5, preferably a wet electrostatic filter, that is disposed downstream of the condenser 4, and flue gas is conveyed via an induced draft means 6 to a chimney 7.

EXAMPLE

In the connecting line between the scrubber 3 and the gas condenser 4 of a large-scale plant, a 10% $Na_2S_4$ solution in water from a supply tank 8 is introduced by means of a steam or vapor jet pump or ejector 9 with steam D of $P_ü$=4 bar and $T_{steam}$=220° C. This results in a brief heating of the $Na_2S_4$ solution to temperatures over 100° C. to a maximum of 200° C. The flue gas, which is saturated with moisture, has a water vapor content of about 200 g $H_2O$/kg dry flue gas, and an oxygen content of about 11–12% by volume in the dry flue gas, and a residual dust content of about 33 mg/m$^3$, in standard state, i.e. standard temperature and pressure. The addition of a 10% sodium tetrasulfide solution to the steam corresponds to the introduction of 60–150 mg pure $Na_2S_4$/m$^3$, in standard state, to dry flue gas. The average flue gas volume was 70,000 m$^3$, in standard state,/h. A separation rate of 90–95% was achieved.

When comparing the procedure of the large-scale plant in a laboratory scale with the known procedure utilizing cold air, with sodium tetrasulfide solution separation rates of metallic mercury of 5 to 10% with cold air in comparison to 60% with steam as the auxiliary fluid were achieved. Thus, the separation rate was about one order of magnitude better. The temperature of the synthetic flue gas of $N_2$, $O_2$, $H_2O$ and Hg was 80° C.

Supplied to the steam jet ejector, along with the sodium tetrasulfide solution 8, was preferably a suspension 10 of a carbon-containing sorption agent, such as activated coke. On the one hand, this also contributes to the removal of heavy metals, and on the other hand prevents flowers of sulfur from occurring in the rinse water of the gas condenser 4, especially however in the outflow of the wet electrostatic filter 5.

Instead of a carbon-containing sorption agent, other sorption agents having the same function of offering a relatively large surface area, such as $Al_2O_3$ and zeolite, could also be utilized.

Furthermore, in the vicinity of the introduction of the sodium tetrasulfide solution into the channel between the scrubber 3 and the gas condenser 4, an oxidizing agent 11, preferably $H_2O_2$, can be dosed in. Instead of $H_2O_2$, other oxidizing agents, such as $O_3$ and NaOCl, could also be utilized.

FIG. 2 illustrates an arrangement for carrying out the method where the gas, after the sodium tetrasulfide solution has been added, is not conveyed to a gas condenser 4 and a subsequently disposed wet electrostatic filter 5, but rather after the temperature has been raised the gas is heated in a heat exchanger 12 that is disposed downstream of the scrubber 3, and is conveyed through a layered fabric filter 13.

The method was described in conjunction with a refuse incinerator. It can also be utilized for processing other Hg-containing waste or flue gases of, for example, chemical manufacturing processes, flue gases from power plants fired with fossil fuels, flue gases from clarifying slurry incinerators, or flue gases from metallurgical sintering plants.

The present invention is, of course, in no way restricted to the specific disclosure of the specification and drawings, but also encompasses any modifications within the scope of the appended claims.

What is claimed is:

1. A method of removing mercury from a mercury-containing flue gas that may also contain dust, further heavy metals, and further gaseous noxious gas components, said method including the steps of:

providing an alkali sulfide solution;

heating said alkali sulfide solution to a temperature between about 100–200° C.;

introducing into said flue gas, which is below 300° C., said heated up alkali sulfide solution to convert mercury to mercury sulfide; and precipitating out said mercury sulfide.

2. A method of removing mercury from a mercury-containing flue gas that may also contain dust, further heavy metals, and further gaseous noxious gas components, said method including the steps of:

providing an alkali sulfide solution;

heating said alkali sulfide solution to a temperature between about 100–200° C. with an auxiliary fluid;

introducing into said flue gas, which is below 300° C., said heated up alkali sulfide solution, together with said auxiliary fluid, to convert mercury to mercury sulfide; and precipitating out said mercury sulfide.

3. A method of removing mercury from a mercury-containing flue gas that may also contain dust, further heavy metals, and further gaseous noxious gas components, said method including the steps of:

providing an alkali sulfide solution;

heating said alkali sulfide solution by about 100–200° C.;

introducing into said flue gas, which is below 300° C., said heated up alkali sulfide solution to convert mercury to mercury sulfide; and precipitating out said mercury sulfide.

4. A method of removing mercury from a mercury-containing flue gas that may also contain dust, further heavy metals, and further gaseous noxious gas components, said method including the steps of:

providing an alkali sulfide solution;

heating said alkali sulfide solution to a temperature between about 40–200° C.;

introducing into said flue gas, which is below 300° C., said heated up alkali sulfide solution to convert mercury to mercury sulfide; and precipitating out said mercury sulfide.

5. A method according to claim 4, which includes the step of introducing said alkali sulfide solution by means of an auxiliary fluid that is heated up prior to being united with said alkali sulfide solution.

6. A method according to claim 4, which includes a step of introducing said alkali sulfide solution into said flue gas together with hot steam as auxiliary fluid.

7. A method according to claim 4, which includes a step of introducing said alkali sulfide solution into said flue gas together with at least one component selected from the group consisting of hot air and hot flue gas.

8. A method according to claim 4, wherein the temperature of said flue gas during introduction of said alkali sulfide solution is below 250° C.

9. A method according to claim 4, wherein said alkali sulfide solution is introduced into a flue gas, which is saturated with moisture, at a temperature below 100° C.

10. A method according to claim 4, which includes the step of removing acidic noxious gas components from said flue gas prior to or after the addition of said alkali sulfide solution and subsequent precipitation.

11. A method according to claim 4, which includes the step of adding to said alkali sulfide solution at least one of the group consisting of oxidizing agent and sorption agent prior to or together with the introduction of said alkali sulfide solution into said flue gas.

12. A method according to claim 11, wherein said oxidizing agent is $H_2O_2$ and said sorption agent is activated coke.

13. A method according to claim 4, wherein said alkali sulfide solution is selected from the group consisting of sodium sulfide solution, sodium tetrasulfide solution, and potassium sulfide solution.

14. A method according to claim 4, wherein said temperature range is about 80–200° C.

15. A method of removing mercury from a mercury-containing flue gas that may also contain dust, further heavy metals, and further gaseous noxious gas components, said method including the steps of:

providing an alkali sulfide solution;

heating said alkali sulfide solution to a temperature between about 40–200° C. with an auxiliary fluid;

introducing into said flue gas, which is below 300° C., said heated up alkali sulfide solution, together with said auxiliary fluid, to convert mercury to mercury sulfide; and precipitating out said mercury sulfide.

16. A method according to claim 15, which includes a step of introducing said alkali sulfide solution into said flue gas together with hot steam as auxiliary fluid, or with at least one component selected from the group consisting of hot air and hot flue gas.

17. A method according to claim 15, wherein the temperature of said flue gas during introduction of said alkali sulfide solution is below 250° C.

18. A method according to claim 15, which includes the step of adding to said alkali sulfide solution at least one of the group consisting of oxidizing agent and sorption agent prior to or together with the introduction of said alkali sulfide solution into said flue gas.

19. A method according to claim 15, wherein said temperature range is about 80–200° C.

* * * * *